(12) United States Patent
Cleary et al.

(10) Patent No.: US 6,588,396 B1
(45) Date of Patent: Jul. 8, 2003

(54) SPARK IGNITION DIRECT INJECTION ENGINE WITH OVAL FUEL SPRAY INTO OBLONG PISTON BOWL

(75) Inventors: David J. Cleary, West Bloomfield, MI (US); Tang-Wei Kuo, Troy, MI (US); Paul M. Najt, Bloomfield Hills, MI (US); Rodney Brewer Rask, Grosse Pointe Woods, MI (US); Arun Sushilkumar Paulraj Solomon, Rochester Hills, MI (US); Andreas M. Lippert, Rochester Hills, MI (US); Gerald Andrew Szekely, Jr., Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/061,724

(22) Filed: Feb. 1, 2002

(51) Int. Cl.$^7$ .............................. F02F 3/26; F02B 31/08
(52) U.S. Cl. ................. 123/276; 123/315; 123/661; 123/301; 123/302; 123/308; 239/533.12
(58) Field of Search ................. 123/261, 269, 123/276, 279, 285, 307, 308, 315, 661, 193.6, 298, 305, 301, 302; 239/533.12

(56) References Cited

U.S. PATENT DOCUMENTS

| | | | | |
|---|---|---|---|---|
| 5,540,388 A | * | 7/1996 | Sasao ..................... | 239/417.3 |
| 5,553,588 A | | 9/1996 | Gono et al. ............... | 123/276 |
| 5,711,269 A | * | 1/1998 | Oda et al. ................. | 123/262 |
| 5,806,482 A | * | 9/1998 | Igarashi et al. ........... | 123/259 |
| 5,819,700 A | * | 10/1998 | Ueda et al. ............... | 123/262 |
| 5,873,344 A | * | 2/1999 | Kudou et al. ............. | 123/295 |
| 6,035,823 A | * | 3/2000 | Koike et al. .............. | 123/276 |
| 6,152,103 A | * | 11/2000 | Kudo et al. ............... | 123/261 |
| 6,173,690 B1 | * | 1/2001 | Iriya et al. ................ | 123/295 |
| 6,186,113 B1 | * | 2/2001 | Hattori et al. ............. | 123/298 |
| 6,220,215 B1 | * | 4/2001 | Morimoto ................. | 123/193.6 |
| 6,223,715 B1 | * | 5/2001 | Suzuki ..................... | 123/276 |
| 6,263,855 B1 | * | 7/2001 | Kobayashi et al. ........ | 123/295 |
| 6,269,789 B1 | * | 8/2001 | Abe et al. ................. | 123/294 |
| 6,286,477 B1 | * | 9/2001 | Yang et al. ............... | 123/263 |
| 6,289,870 B1 | * | 9/2001 | Kanda et al. ............. | 123/298 |
| 6,308,684 B1 | * | 10/2001 | Konishi .................... | 123/432 |
| 6,311,665 B1 | * | 11/2001 | Yasuoka et al. .......... | 123/260 |
| 6,334,426 B1 | * | 1/2002 | Sasaki et al. ............. | 123/298 |
| 6,336,437 B1 | * | 1/2002 | Baika et al. .............. | 123/298 |
| 6,341,591 B1 | * | 1/2002 | Tsutsumi et al. ......... | 123/295 |
| 6,345,601 B1 | * | 2/2002 | Miyajima et al. ......... | 123/305 |
| 6,443,119 B1 | * | 9/2002 | Pontoppidan ............. | 123/294 |
| 6,494,178 B1 | * | 12/2002 | Cleary et al. ............. | 123/276 |

OTHER PUBLICATIONS

U.S. patent application Ser. No. 09/930,707 filed Aug. 13, 2001 entitled "Combustion Chamber Including Piston for a Spark–Ignition Direct–Injection Combustion System" in name of David J. Cleary et al.

* cited by examiner

Primary Examiner—Henry C. Yuen
Assistant Examiner—Hai Huynh
(74) Attorney, Agent, or Firm—Kathyrn A. Marra

(57) ABSTRACT

The present invention provides a fuel injector mounted on a side of a combustion chamber and delivers an ovalized fuel spray toward an oblong piston bowl of the chamber. The ovality of the spray is selected in relation to the oblong piston bowl and the motion of the combustion chamber air charge during the piston compression stroke to maintain the fuel charge within the piston bowl volume (including the space above the bowl) during compression and combustion of the fuel charge in the chamber. The shape of the oval spray may be adjusted as desired. In a specific embodiment, the ovality of the fuel spray indicated by the ratio of the major dimension to the minor dimension is in the range of about 2/1 to 4/1 for delivery into an oblong piston bowl with an ovality of about 1.2/1 to 1.5/1.

8 Claims, 2 Drawing Sheets

SPARK IGNITION DIRECT INJECTION ENGINE WITH OVAL FUEL SPRAY INTO OBLONG PISTON BOWL

TECHNICAL FIELD

This invention relates to combustion chambers for use in spark ignition engines having direct-injection fuel systems.

BACKGROUND OF THE INVENTION

Spark-ignition, direct-injection combustion systems for internal combustion engines have been proposed to improve fuel economy when compared with more typical port fuel-injected combustion systems. The spark-ignition, direct-injection engine is provided with a high pressure fuel injection system that sprays fuel directly into the engine combustion chamber which is formed, at least partially, in the piston. The fuel is directed or transported to a specific region within the combustion chamber. This creates a stratified charge in the combustion chamber resulting in fuel economy benefits, since the throttling requirements are less restrictive and the fuel combustion characteristics are improved. Conventional fuel injectors providing a conical fuel spray may be used in such engines. However, injectors providing a fan shaped fuel spray have also been proposed.

U.S. patent application Ser. No. 09/930,707 filed Aug. 13, 2001 and assigned to the assignee of the present invention, discloses an improved combustion chamber for a spark ignition direct injection engine. The piston includes an oblong or oval shaped bowl, forming 50% to 70% of the total combustion chamber volume at piston top center, into which a fuel spray is injected during the piston compression stroke. Various physical and dimensional features of the piston and combustion chamber and the use of a conventional direct injection fuel injector are disclosed.

SUMMARY OF THE INVENTION

The present invention provides improved combustion chambers including fuel injectors having an oval fuel spray for use with direct injection engine combustion chambers of the type disclosed in the previously mentioned patent application U.S. Ser. No. 09/930,707 as well as in other applications.

In a preferred embodiment, a fuel injector is mounted on a side of the combustion chamber and delivers an ovalized fuel spray toward an oblong piston bowl of the associated combustion chamber. The ovality of the spray is selected in relation to the oblong piston bowl and the motion of the combustion chamber air charge during the piston compression stroke to maintain the fuel charge within the piston bowl volume (including the space above the bowl) during compression and combustion of the fuel charge in the chamber.

The shape of the oval spray may be adjusted as desired in relation to the shape of the piston bowl, as well as for use in other applications of an oval spray injector. As used in a specific embodiment the ovality of the fuel spray indicated by the ratio of the major axis to the minor axis is in the range of about 2/1 to 4/1 for delivery into an oblong piston bowl with an ovality of about 1.2/1 to 1.5/1.

These and other features and advantages of the invention will be more fully understood from the following description of certain specific embodiments of the invention taken together with the accompanying drawings.

DESCRIPTION OF THE PREFERRED EMBODIMENT

Figure 1:
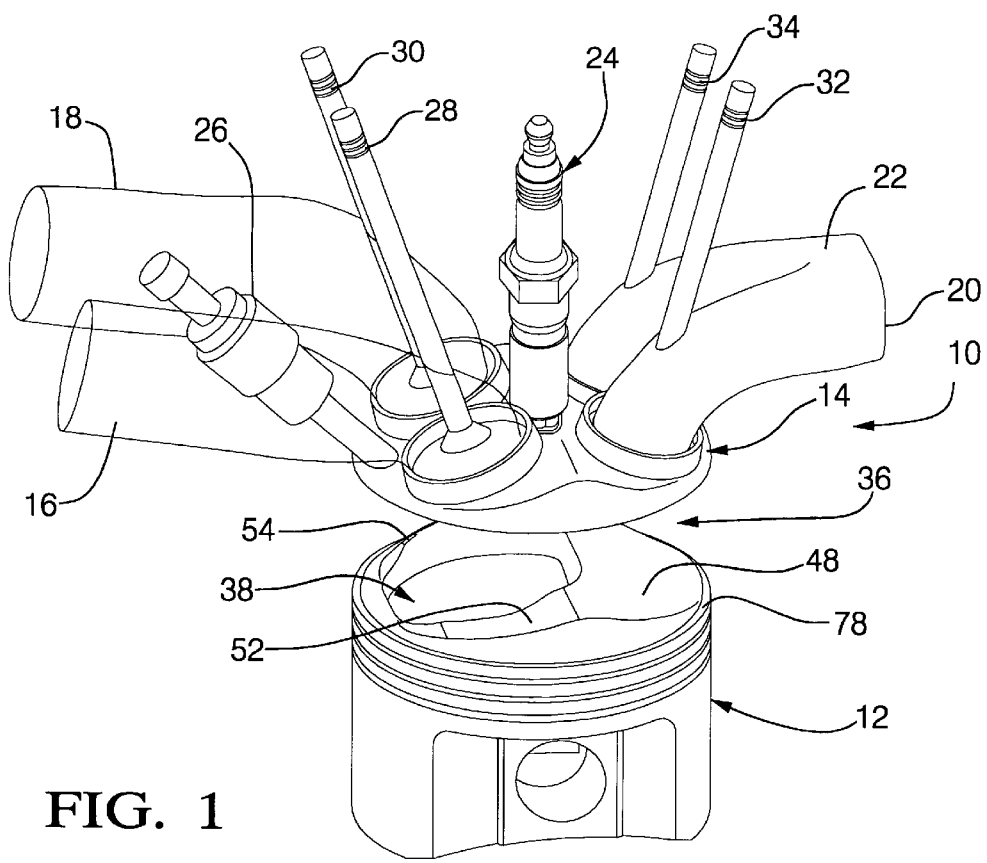
FIG. 1 is an isometric view of a portion of an engine containing a piston and a portion of a cylinder head with the intake and exhaust valves, the ignition source and the fuel injector incorporating the present invention.

A portion of an engine 10 includes a piston 12 and a cylinder head 14 closing the end of the cylinder. The cylinder head 14 has a primary inlet port 16, a secondary inlet port 18, a pair of outlet ports 20 and 22, an ignition source or spark plug 24, a fuel injector 26, two inlet valves 28 and 30 and two exhaust valves 32 and 34. The spark plug 24 is a conventional device that supplies an ignition source or spark to the combustion chamber 36 formed between the piston 12, a cylinder wall or bore 37, and the cylinder head 14. The fuel injector 26 is a modified direct injection device that is designed according to the invention to inject an ovalized spray of fuel into the combustion chamber 36 during engine operation. The amount and timing of the fuel injection is controlled by a conventional electronic control unit (ECU) that includes a programmable digital computer. These control devices are well known to those skilled in the art of engine design.

The inlet valve 28 controls the flow of air into the combustion chamber 36 through the primary inlet port 16, and the inlet valve 30 controls the flow of air into the combustion chamber 36 through the secondary inlet port 18. The exhaust valves 32 and 34 control the flow of exhaust products from the combustion chamber 36 through the exhaust ports 20 and 22, respectively. The opening and closing of the valves 28, 30, 32 and 34 is controlled in a conventional manner such as through the employment of a cam mechanism, not shown.

Figure 2:
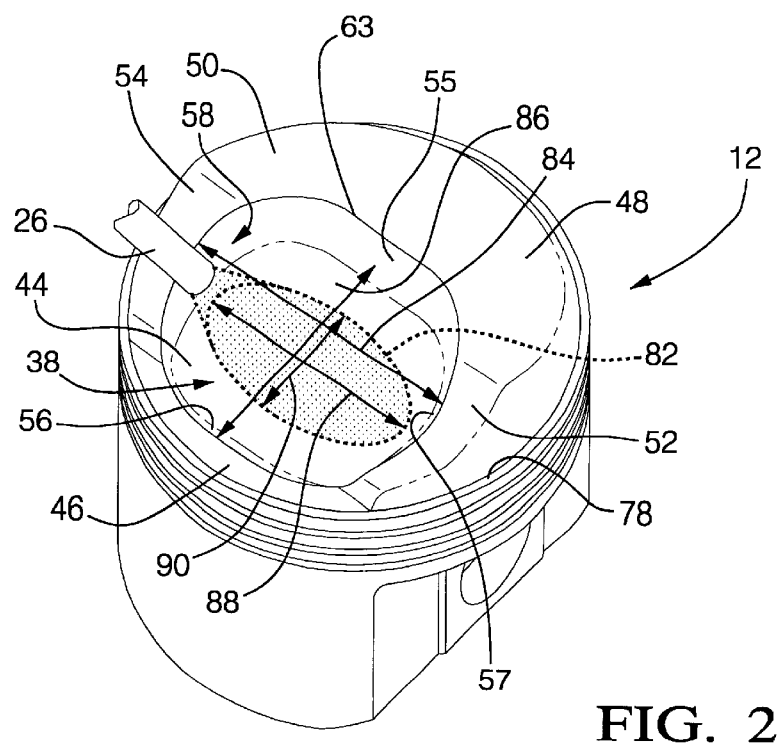
FIG. 2 is an isometric view of the fuel injector delivering an ovalized fuel spray into the piston bowl in accordance with the invention.
Figure 3:
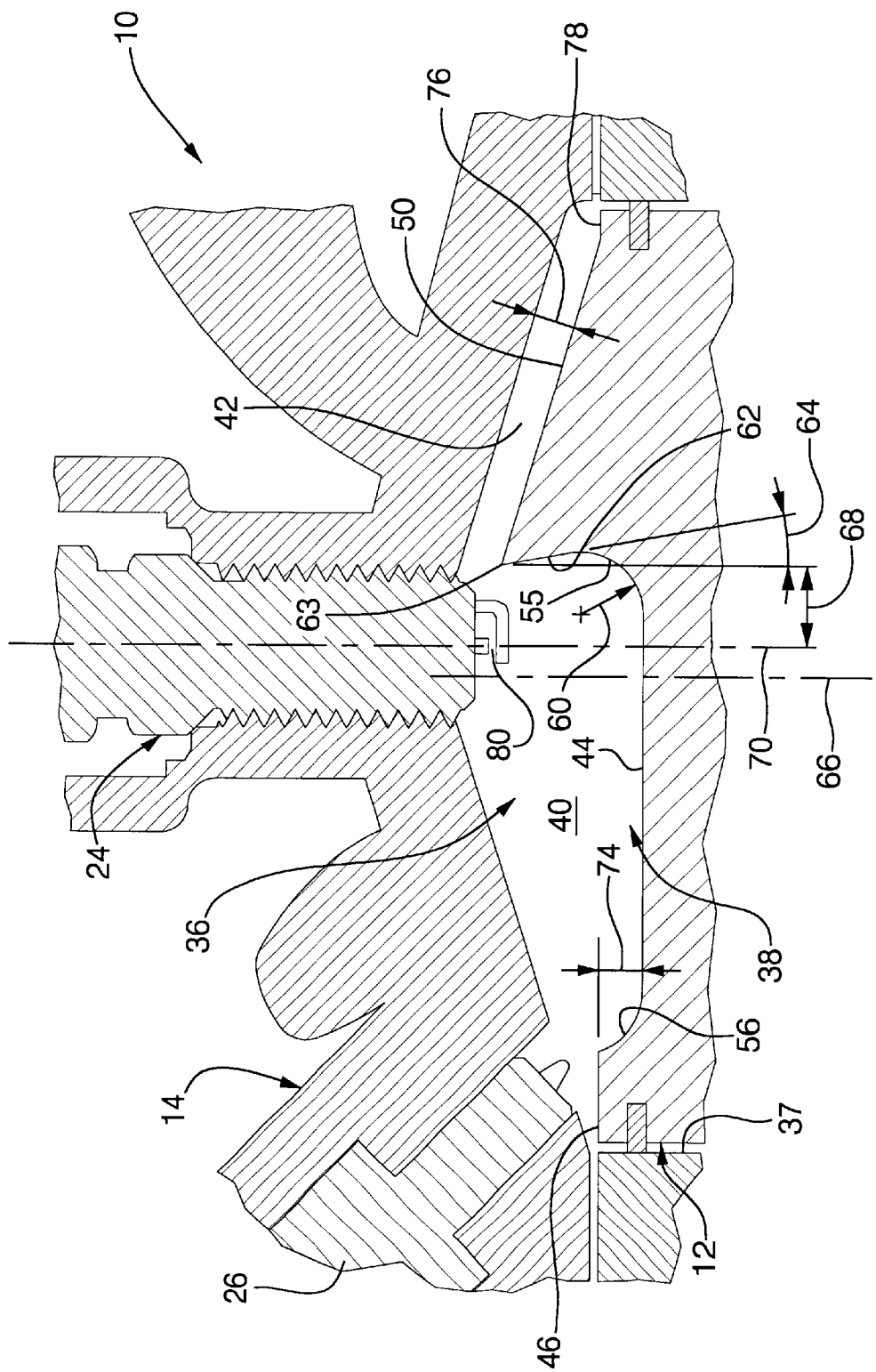
FIG. 3 is a partial cross-sectional elevational view of a piston and cylinder head with an ovalized spray injector incorporating the present invention.

As best seen in FIGS. 2 and 3, the piston 12 has a bowl 38 formed therein. The combustion chamber 36 includes a bowl volume 40 and a volume space 42. The bowl volume 40 consists of the volume of the bowl 38 and the space between the bowl 38 and the cylinder head 14. The volume space 42 includes the volume between the cylinder head 14 and the piston 12 external to the periphery of the bowl 38. The bowl 38 has a floor 44, an inner edge of a rim surface 46, inner edges of exhaust squish surfaces 48 and 50, inner edges of inlet squish surfaces 52 and 54, a transporting surface 55, and three side surfaces 56, 57 and 58 that connect with the transporting surface 55 to surround the bowl and extend upward to the edges of, respectively, the rim surface 46, the inlet squish surfaces 52 and 54, and the inner edges of the exhaust squish surfaces 48 and 50.

The transporting surface 55 includes a bowl radius 60, having a dimension in the range of from 3 to 12 mm, and, optionally, a flat surface 62. Together, the bowl radius and the flat surface, if provided, extend upward from the floor 44 to a substantially linear edge 63 forming part of the inner edges of exhaust squish surfaces 48 and 50. The floor 44 and the flat surface 62, if provided, are tangential to the bowl radius 60. The flat surface 62 (or the upper edge of the bowl radius 60 if there is no flat surface) intersects the squish surfaces 48 and 50 at a negative draft angle 64 (FIG. 3) in the range of 0 to −20 degrees, relative to the axis 66 of the cylinder bore 37. This forms the linear edge 63, which is laterally displaced a distance 68 in the range of 6 to 10 mm from the centerline 70 of the spark plug 24. The side surface 56 is formed as a radius surface that connects tangentially with the floor 44 and the side surfaces 57 and 58 also connect with the floor by tangential radii, not clearly shown. The rim surface 46 is spaced a distance 74 (3 to 8 mm) from the floor 44.

The exhaust squish surface 48 is positioned opposite the exhaust valve 32 and the exhaust squish surface 50 is positioned opposite the exhaust valve 34. The intake squish surfaces 52 and 54 are positioned opposite the intake valves 28 and 30, respectively. When the piston 12 is at top center in the cylinder 37, as shown in FIG. 3, the squish clearance or distance 76 between the cylinder head 14 and the respective squish surfaces 48, 50, 52 and 54 is in the range of 2 to 6 mm. The volume ratio (VR) of the bowl volume (VB) to total combustion chamber volume (VT) at top center is also an important design parameter insuring that proper combustion will occur. The total volume of the combustion chamber 36 at top center is the space volume 42 plus the bowl volume 40. Thus, the volume ratio is the bowl volume 40 divided by space volume 42 plus bowl volume 40 (VR=VB/VT). This volume ratio is maintained in the range 0.50 to 0.70. This means that the bowl volume is 50% to 70% of the total combustion chamber volume at piston top center. A peripheral surface 78 extends around the outer edge of the piston 12 from the inlet squish surface 52 past the exhaust squish surfaces 48 and 50 to the inlet squish surface 54. The peripheral surface 78 is an extension of the rim surface 46 and has a radial dimension in the range of 0 to 6 mm. The outer edges of the peripheral surface 78 and the rim surface 46 essentially define the outer edge of the piston 12 and, due to the close proximity of the cylinder wall 37, the outer periphery of the combustion chamber 36.

When the engine is operating in a stratified charge combustion mode, the piston 12 is reciprocated in the cylinder bore 37 such that the combustion chamber 36 expands and contracts during the operating cycle of the engine. During the intake stroke, one or both of the intake valves 28, 30 are opened to admit an air mass into the cylinder bore. During the compression stroke, the valves are closed and the air mass is compressed as the piston approaches top center. Also during the compression stroke, fuel is injected directly into the combustion chamber 36 by the fuel injector 26 to mix with the air mass. The amount and timing of fuel injected is controlled by the ECU. The fuel-air mixture is ignited by the spark plug 24 at or slightly before top center. The ignited mixture is rapidly expanded as the piston moves down during the power stroke. At approximately bottom center, the exhaust valves 32 and 34 are opened and the piston 12 again moves upward toward the cylinder head 14 during the exhaust stroke so that the exhaust gases are forced from the cylinder bore. The intake stroke is then repeated.

When fuel is injected into the air mass, it is carried across the floor 44 of the bowl 38 toward the transporting surface 55 as it mixes with the air mass. The edge 63 of the transporting surface 55 directs the fuel-air mixture to a spark gap 80 of the spark plug 24 where ignition begins. The ignited fuel-air mixture rapidly expands to encompass the entire combustion chamber 36 and efficiently deliver power from the engine. The dimensional parameters of the piston 12 and the combination of the piston 12 and cylinder head 14 are important factors in the distribution of the fuel-air mixture and the resulting combustion sequence.

The engine is operated as described above to create stratified charges in the combustion chamber to permit the ignition of lean fuel-air mixtures under low and intermediate loads. At loads nearer the maximum power of the engine, a homogeneous fuel distribution mode may be used. In this mode, the fuel is injected during the intake stroke to mix with the inlet air prior to interaction with the piston bowl features described, which are provided primarily for stratified charge operation.

The forgoing describes, except for the modified fuel injector, the exemplary embodiment of the invention essentially as described in application U.S. Ser No. 09/930,707 noted above. The exemplary embodiment of the present invention differs in that the injector 26 is modified to deliver a unique oval or elliptical spray pattern 82 of fuel into the oblong or oval piston bowl 38, substantially as shown in FIG. 2 of the drawings. For reference, numerals 84, 86 indicate, respectively the major and minor dimensions of the oblong piston bowl 38. Numerals 88, 90 indicate, respectively, the major and minor dimensions of the oval fuel spray pattern 82. The ovality of the piston bowl is relatively small, preferably having a major/minor dimensional ratio in the range of 1.2/1 to 1.5/1. In contrast, the preferred ovality of the fuel spray pattern is greater, defined by a major/minor dimensional ratio in the range of 2/1 to 4/1.

Selection of spray pattern ovality is made in consideration of the flow of the cylinder air charge in the cylinder during the piston compression stroke when the fuel is injected during operation of the engine under stratified charge conditions. Comparative evaluation of operation of the engine with fuel injectors with a conical spray pattern and the elliptical oval spray pattern of the invention showed better engine performance and reduced smoke for the oval spray pattern than for conical spray patterns over a range of cone angles. It is considered that the ovalized spray is better in maintaining the fuel spray and resulting combustible mixture within the area of the piston bowl so that it does not penetrate beyond the bowl and cause increased hydrocarbon emissions and does not excessively impact on the bottom of the bowl and increase smoke.

It should be clear that the neither the fuel spray nor the piston bowl needs to be a perfect oval or ellipse in order to operate successfully. It is only necessary that they be oblong or approximately oval shaped with different major and minor dimensions.

Thus, while the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A combustion chamber for a direct injection spark ignition engine, the combustion chamber comprising:

a cylinder having a closed end;

a spark plug extending through the closed end with a spark gap in the cylinder;

a piston in the cylinder having a head end partially defining the combustion chamber;

a recessed bowl in the piston head end, the bowl having an oblong configuration with a minor dimension extending from an outer edge adjacent an edge of the piston to an inner edge at a point beyond and adjacent the spark gap and a major dimension generally normal to the minor dimension;

a fuel injection nozzle extending through a side of the cylinder closed end nearest the outer edge of the piston bowl, the nozzle operative to direct an ovalized fuel spray pattern toward the piston bowl, the spray pattern captured within the bowl and having major and minor dimensions generally parallel with the major and minor dimensions of the bowl.

2. A combustion chamber as in claim 1 wherein the major/minor dimensional ratio of the fuel spray pattern is in the range of about 2/1 to 4/1 and the major/minor dimensional ratio of the piston bowl is in the range of about 1.2/1 to 1.5/1.

3. A combustion chamber as in claim 1 wherein the bowl configuration is generally oval while the fuel spray pattern is a generally elliptical oval.

4. A combustion chamber for an internal combustion engine comprising:

a cylinder head having an inlet port and an exhaust port formed therein with valve members disposed in the ports for controlling the flow of air and products of combustion to and from the combustion chamber, an ignition source, and a fuel injection device;

a cylinder positioned to receive air and fuel injected directly from the fuel injection device;

a piston mounted for reciprocation in the cylinder, said piston including a bowl having a floor, a rim surface, a transporting surface, side surfaces joined with the transporting surface, and forming an oblong configuration with a minor dimension extending from the rim surface to the linear edge and a major dimension generally normal to the minor dimension;

the fuel injection device being operative to direct an ovalized fuel spray pattern toward the piston bowl having major and minor dimensions generally parallel, respectively, with the major and minor dimensions of the bowl;

said transporting surface including an arcuate portion tangential with the floor and a linear edge spaced a predetermined distance from a centerline of said ignition source, and said transporting surface at the linear edge being disposed at a negative draft angle in the range of zero degrees to minus twenty degrees relative to an axis of the cylinder bore; and said rim surface being displaced above the floor by a distance in the range of three to eight millimeters.

5. A combustion chamber as in claim 4 including:

said predetermined distance being in the range of six to ten millimeters; and said arcuate surface having a radius in the range of three to twelve millimeters.

6. A combustion chamber as in claim 4 including:

said cylinder head having two exhaust ports with an exhaust valve in each exhaust port and two inlet ports with an inlet valve in each inlet port; and exhaust squish surfaces on the piston between said transporting surface and a peripheral surface of the piston and positioned opposite respective ones of the exhaust valves, intake squish surfaces on the piston between opposite sides of the bowl and said peripheral surface and positioned opposite respective ones of said intake valves, each exhaust squish surface and each intake squish surface being spaced from said cylinder head by a dimension in the range of two to six millimeters when said piston is at a top center location in said cylinder bore.

7. A combustion chamber as in claim 6 wherein said peripheral surface has a radial dimension in the range of from zero to six millimeters.

8. A combustion chamber as in claim 4 including:

said bowl having a bowl volume defined by a bowl recess and a space between the bowl and the cylinder head when the piston is at a top center location in said combustion chamber;

said combustion chamber having a total volume defined by the space between the piston and the cylinder head including the bowl volume when the piston is at the top center location; and said bowl volume being in the range of 50% to 70% of the total volume.

* * * * *